(12) United States Patent
Thronicke et al.

(10) Patent No.: US 7,730,687 B2
(45) Date of Patent: Jun. 8, 2010

(54) MULTILAYER DECOUPLING SYSTEM

(75) Inventors: Sandro Gerd Thronicke, Lunen (DE); Peter Wilhelm Blanke, Iserlohn (DE)

(73) Assignee: Blanke GmbH & Co., KG, Iserlohn (DE)

( * ) Notice: Subject to any disclaimer, the term of this patent is extended or adjusted under 35 U.S.C. 154(b) by 0 days.

(21) Appl. No.: 12/501,522

(22) Filed: Jul. 13, 2009

(65) Prior Publication Data

US 2009/0272059 A1   Nov. 5, 2009

Related U.S. Application Data

(63) Continuation of application No. 10/595,697, filed as application No. PCT/DE2004/002470 on Nov. 5, 2004.

(30) Foreign Application Priority Data

Nov. 6, 2003 (DE) .............................. 203 17 248 U
Jun. 1, 2004 (DE) ........................ 10 2004 026 652

(51) Int. Cl.
  *E04F 13/08* (2006.01)
(52) U.S. Cl. .............................. 52/388; 52/384; 52/385; 52/389; 52/391; 52/507
(58) Field of Classification Search .................. 52/388, 52/384, 385, 389, 391, 747.11, 506.01, 507
See application file for complete search history.

(56) References Cited

U.S. PATENT DOCUMENTS 1,867,897 A    7/1932   Standbrough
2,887,867 A    5/1959   Burchenal et al.
3,740,911 A    6/1973   O'Leary
4,633,633 A    1/1987   Bard
5,238,721 A    8/1993   Nakazawa (Continued)

FOREIGN PATENT DOCUMENTS

DE    8814650 U1    3/1989

(Continued)

OTHER PUBLICATIONS

PCT Search Report dated Mar. 1, 2005 of Patent Application No. PCT/DE2004/002470 filed Nov. 5, 2004.

(Continued)

*Primary Examiner*—Richard E Chilcot, Jr.
*Assistant Examiner*—Mark R Wendell
(74) *Attorney, Agent, or Firm*—Vern Maine & Associates

(57) ABSTRACT

The invention relates to a multi-layer decoupling system, in particular for the laying of ceramic paving according to a thin-bed method. Said system comprises a layered construction containing, from the base upwards, an anchoring fleece made of non-woven material, an anchorage layer that is configured from a lattice-type structural element and that is used to hold a filler material, which is to be incorporated into the upper face of the decoupling system and which is plastic during processing and subsequently cures, in addition to a reinforcement layer, which is fixed, at least in some sections, to the anchorage layer. This improves the load-bearing capacity of the decoupling system and the bonding properties of ceramic paving that is laid in a conventional manner on the decoupling system.

21 Claims, 2 Drawing Sheets

U.S. PATENT DOCUMENTS

| | | |
|---|---|---|
| 5,546,708 A | 8/1996 | Efstratis et al. |
| 5,816,005 A | 10/1998 | Han |
| 6,151,854 A | 11/2000 | Gutjahr |
| 6,171,015 B1 | 1/2001 | Barth et al. |
| 6,901,712 B2 | 6/2005 | Lionel |

FOREIGN PATENT DOCUMENTS

| | | | |
|---|---|---|---|
| DE | 29622129 U1 | 6/1997 | |
| DE | 29921970 U | 4/2001 | |
| DE | 10060751 C1 | 9/2002 | |
| DE | 20317247 U | 2/2004 | |
| EP | 0386324 A | 9/1990 | |
| FR | 2774715 A | 8/1999 | |
| WO | 9925940 | 5/1999 | |
| WO | 9954571 A | 10/1999 | |
| WO | 0042258 | 7/2000 | |

OTHER PUBLICATIONS

PCT Search Report dated Apr. 6, 2005 of Patent Application No. PCT/DE2004/002457 filed Nov. 5, 2004.

MULTILAYER DECOUPLING SYSTEM

RELATED APPLICATIONS

This application is a Continuation of U.S. application Ser. No. 10/595,697, filed May 5, 2006, which is a U.S. National Phase of PCT Application No. PCT/DE2004/002470, filed Nov. 5, 2004, which claims priority to German Application Nos. DE 203 17 248.5, filed Nov. 6, 2003 and DE 10 2004 026 652.2, filed Jun. 1, 2004. Each of these applications is herein incorporated in its entirety by reference.

FIELD OF THE INVENTION

The present invention relates to a multilayer decoupling system, in particular for laying ceramic paving by using a thin-bed method.

BACKGROUND OF THE INVENTION

Today, ceramic paving, in particular ceramic tiles, is usually laid using the so-called thin-bed method, in which the ceramic paving is laid in a thin, adhesive layer of tile mortar. This method, which is satisfactory for interior applications, is problematic when ceramic paving is to be laid in an exterior area, because the effects of moisture and temperature on paving of this kind frequently result in the gradual destruction of the tiles or the base in which they are laid, and it becomes impossible to avoid the diminished reliability of this type of paving, with the result that costly repair work may be required. Moisture that penetrates through the tile paving into the substratum frequently results in damage to the building itself because the moisture cannot escape easily. This occurs frequently in the case of balconies that are to be sealed.

In addition to the foregoing, it is difficult to control the crack behavior of the ceramic paving and of the substratum because of the very different coefficients of expansion of the substratum, the thin-bed mortar, and the ceramic paving, which are brought about by the very high temperature differences between the high temperatures caused by solar radiation and the low temperatures caused by frost that occur in the exterior area. For this reason, there is frequently cracking in the tile paving if it is joined rigidly to the substratum.

For this reason, it has frequently been proposed that ceramic paving of this type that is laid in an exterior area can be laid in a more durable fashion in that the ceramic paving is deliberately decoupled from the substratum. It is true that such decoupling ensures that mechanical decoupling is effected transversely to the area that is paved; it also entails the disadvantage that the mechanical load-bearing capacity of the tile paving is inadequate. On the one hand, the tiles are not anchored firmly enough to the decoupling system, and on the other hand, the pressure strength of the decoupling system itself is not optimal.

This type of configuration for a decoupling and sealing system is described in DE 100 60 751 C1. In this configuration, what is proposed is a decoupling and sealing system that has a plastic or bitumen layer underneath, above which are disposed a first non-woven layer that is of a first hydrophobic polymer; above this there is a drainage layer that is of a second hydrophobic polymer, and then, above this, a second non-woven layer that is of the first hydrophobic polymer. It is true that, within certain limits, this layered construction permits moisture that has penetrated to drain out of the substratum of a tile layer; however, the mechanical load-bearing capacity of a layered, construction of this kind is unsatisfactory since embedding the uppermost non-woven layer in the tile mortar does not permit adequate anchoring or reinforcing function. The drainage layer is in the form of a lattice-type layer, although no exact details for forming the lattice-type layer are provided.

EP 0 386 324 A2 describes a bituminous adhesive agent that has a non-woven layer laminated onto a bitumen carrier layer, upon which there is a lattice-type fabric as a reinforcing layer for the improved attachment of a cement mortar for a tile layer that is to be applied thereto.

FR 2 774 715 A1, like DE 88 14 650.2, describes a layered structure for covering cracks, with a lattice-like reinforcing structure for embedding tile mortar.

SUMMARY OF THE INVENTION

For this reason, it is the objective of the present invention to so develop a multilayer decoupling system of this type such that an improvement of the mechanical load-bearing capacity and anchoring to the tile layer can be achieved.

The present invention describes a multilayer decoupling system, used in particular for laying ceramic tiles using a thin-bed method, which is of a layered construction that consists, listed from bottom to top, of an anchoring fleece made of non-woven material, an anchoring layer formed by a lattice-type structural element for a filler material that is to be incorporated into the upper face of the decoupling system, which is plastic during processing and subsequently cures; and a reinforcing layer that is fixed, at least in some sections, to the anchoring layer. In particular because of the anchoring layer that is disposed on top and the reinforcing layer that is laid on top of and secured to it, it is ensured that joint mortar that is applied to the top face bonds completely with the decoupling system, thereby ensuring appropriate load-bearing capacity for the decoupling system. The lattice-type structural element permits particularly simple construction of the anchoring layer that essentially determines the thickness of the decoupling system. It is also conceivable that a sealing function can be formed by an anchoring layer of a non-woven material that is impermeable to liquid. Because of its structure, such an anchoring layer bonds particularly well to the substratum, and is familiar in principle. The layer of the anchoring fleece ensures a very good anchoring of the decoupling system to the substratum for example by joint mortar or glue, which can be disposed to the substratum and in which the anchoring fleece can be embedded strongly.

In a first configuration, provision can also be made such that the lattice-type structural element is formed from individual rods that are disposed relative to one another in the form of a lattice and secured to one another at the intersection points of the lattice. A lattice-type structural element of this kind can be manufactured very simply from identical, prefabricated individual rods, and for this reason it is possible to use individual rods that have been extruded cost effectively and wound onto drums and in each instance are positioned relative to each other for the production of the lattice-type structural elements. This makes production of such a lattice-type structural element both cost effective and simple. Unlike the case with other known decoupling and sealing systems, no costly tools have to be made in order to manufacture areas that are angled relative to one another and formed in other ways. In another embodiment, provision is made such that the individual rods of the lattice-type structural element are of an essentially rectangular cross section. In particular, if the edges of the individual rods are of unequal dimensions, the thickness of the lattice-type structural elements can be modified very simply and matched to various requirements.

It is a particular advantage if the intersecting individual rods of the lattice-type structural elements are so arranged that a first layer consists of identically oriented individual rods arranged beneath a second layer of individual rods disposed at an angle relative to the first rods and that are oriented identically to each other. This eliminates the need to warp the individual rods to one another during production, as is the case with textile fabrics; this further simplifies the production process and ensures that corresponding open spaces are formed between the identical layers of the lower and upper courses of individual rods, so that these spaces can be used for incorporating the filler material. It is also conceivable that the lattice-type structure of individual rods be in the form of a rhombus, a rectangle, or a square. Other geometrical shapes can be also be used.

Further simplification of production of the drainage layer can be achieved if the individual rods of the two layers are welded to one another under pressure in the area where they intersect. For instance, by heating the individual rods, which can be shaped plastically by the effects of temperature, it can be ensured that softening and welding to the individual rod that lies in each instance below can take place in the area where the individual rods are in contact with each other. This then results in a matting-like structure made up of individual rods.

It is also conceivable that, for instance when welding the individual rods, the individual rods of the lattice-type structural element have slanted edge areas at least at the points of intersection with one another; this forms under-cut sections on the individual rods. Because of the plastic reshaping of the individual rods in the points of intersection brought about by the effects of temperature, the individual rods are deformed somewhat by mechanical pressure and thereby change their orientation, depending on the course of the other individual rod that is to be joined with the particular rod. This leads to the formation of undercuts areas that are, for instance, advantageous for anchoring the filler material. Because of its plasticity, the filler material penetrates into these undercut areas when being worked and, after hardening, can adhere very much better to the anchoring layer because of the undercuts in the individual rods.

It is additionally advantageous if a vapour-pressure equalization layer be interposed between the first and the second layers of individual rods. Such a vapour-pressure equalization layer, which can be formed for instance from a polyethylene film, serves to further seal the substratum and, at the same time, allows moisture to evaporate out of the substratum. When the network of the two groups of individual rods is being assembled, this vapour-pressure equalization layer be positioned between these layers and joined immovably to them by being welded simultaneously. This ensures that production is particularly simple.

In another configuration, it is conceivable that the reinforcing layer be welded or cemented onto the anchoring layer. Because of this, on the one hand, the reinforcing layer can be well embedded in the filler material and, on the other hand, it adheres securely to the anchoring layer, which is similarly filled with filter material. This results in a particularly good bond between the filler material and the reinforcing layer or the anchoring layer, respectively. In this connection, it is conceivable that the reinforcing layer be formed as a lattice-type fabric, preferably as a glass-fiber fabric, which serves to provide more secure anchoring with the filler material that is to be incorporated at the top of the decoupling system.

When handling larger areas of the decoupling system it is an advantage if the reinforcing layer extend beyond the other layers, at least in some edge areas of the decoupling system, in order to create a transition to other sections of the system. This can provide an appropriately overlapped connection on the edges of the individually workable strips that entails no loss of strength in the areas of transition between adjacent strips.

It is also conceivable that the decoupling system can be laid so as to float on a substratum. This ensures complete decoupling of installed tile paving from the underlying substratum, which is necessary in the case of widely differing coefficients of thermal expansion or working substrata such as wooden floors.

In another arrangement, it is conceivable that the decoupling system can be laid rigidly, in one embodiment cemented, on a substratum. This results in more secure attachment of the decoupling system, should this be both permissible and useful because of the properties of said substratum.

With respect to the dimensions of the individual layers of the decoupling system, it is conceivable that the thickness of the anchoring layer be between 2 and 6 mm, and thus, in one arrangement, the overall thickness of the decoupling system amount essentially to between 2 and 8 mm. Because of this, the decoupling system does not essentially fill, relative to a predetermined substratum, and can be used without any problems even in spatially tight construction situations.

It is a significant advantage for the utilization properties of the decoupling system according to the present invention if, after the installation of the filler material, the anchoring layer is essentially completely filled with filler material and the reinforcing layer that is embedded in the hardened filler material performs a stiffening and reinforcing function for dispersing mechanical loads that are introduced from above, with the result that load dispersal is possible through significantly greater layer thicknesses than is the case with known decoupling systems since, in addition, the whole layer thickness of the anchoring layer helps to bear the loads and, at the same time, is reinforced by the reinforcing layer.

In another configuration, the decoupling system can be in the form of a façade panel, so that the attachment of ceramic paving, for example, in a façade can be greatly improved.

It is also conceivable that the decoupling system be configured as a barrier element, in particular of polystyrol, for example, for use in a façade area.

BRIEF DESCRIPTION OF THE DRAWINGS

One embodiment of the decoupling system according to the present invention is shown in the drawings appended hereto. These drawings show the following.

DETAILED DESCRIPTION

Figure 1:
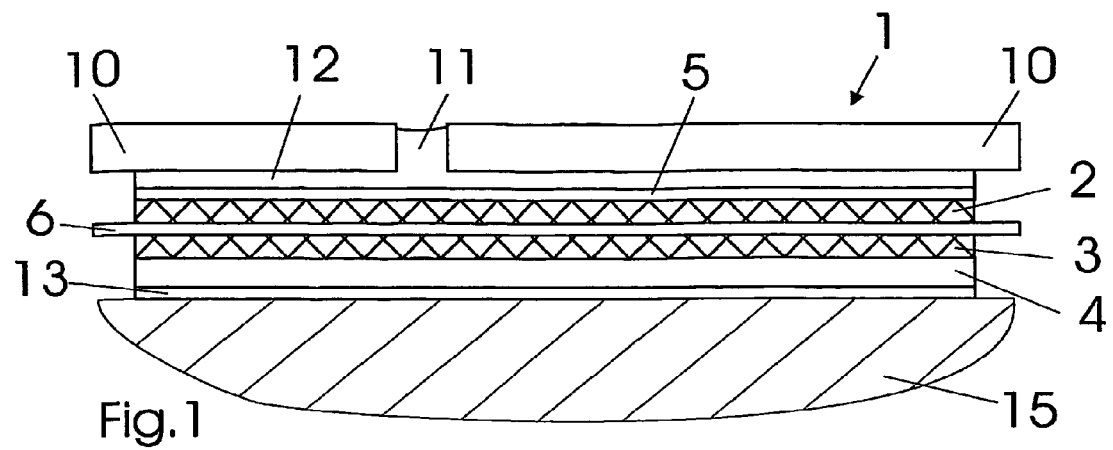
FIG. 1: a cross section through a decoupling system according to one embodiment of the present invention, which shows the layered structure.
Figure 2:
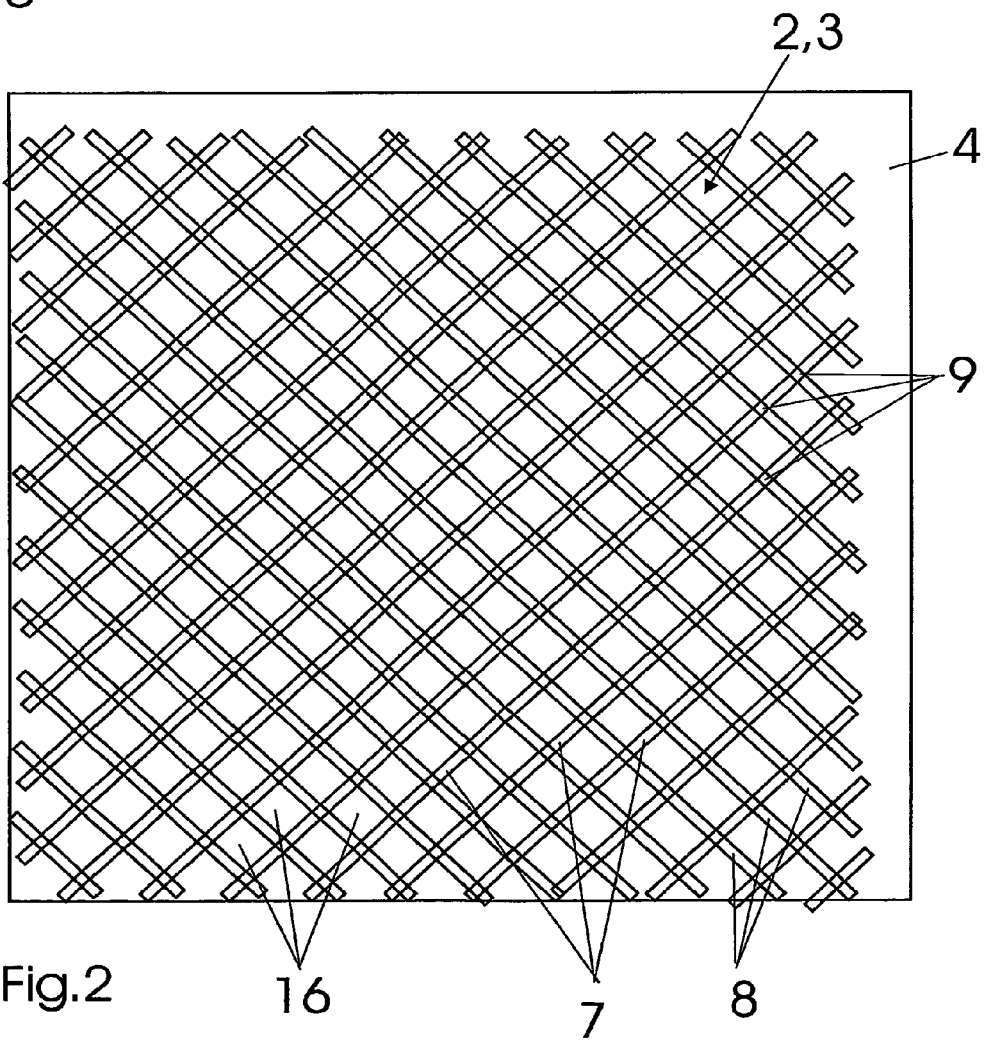
FIG. 2: a plan view of a decoupling system according to one embodiment of the present invention, as shown in FIG. 1.
Figure 3:
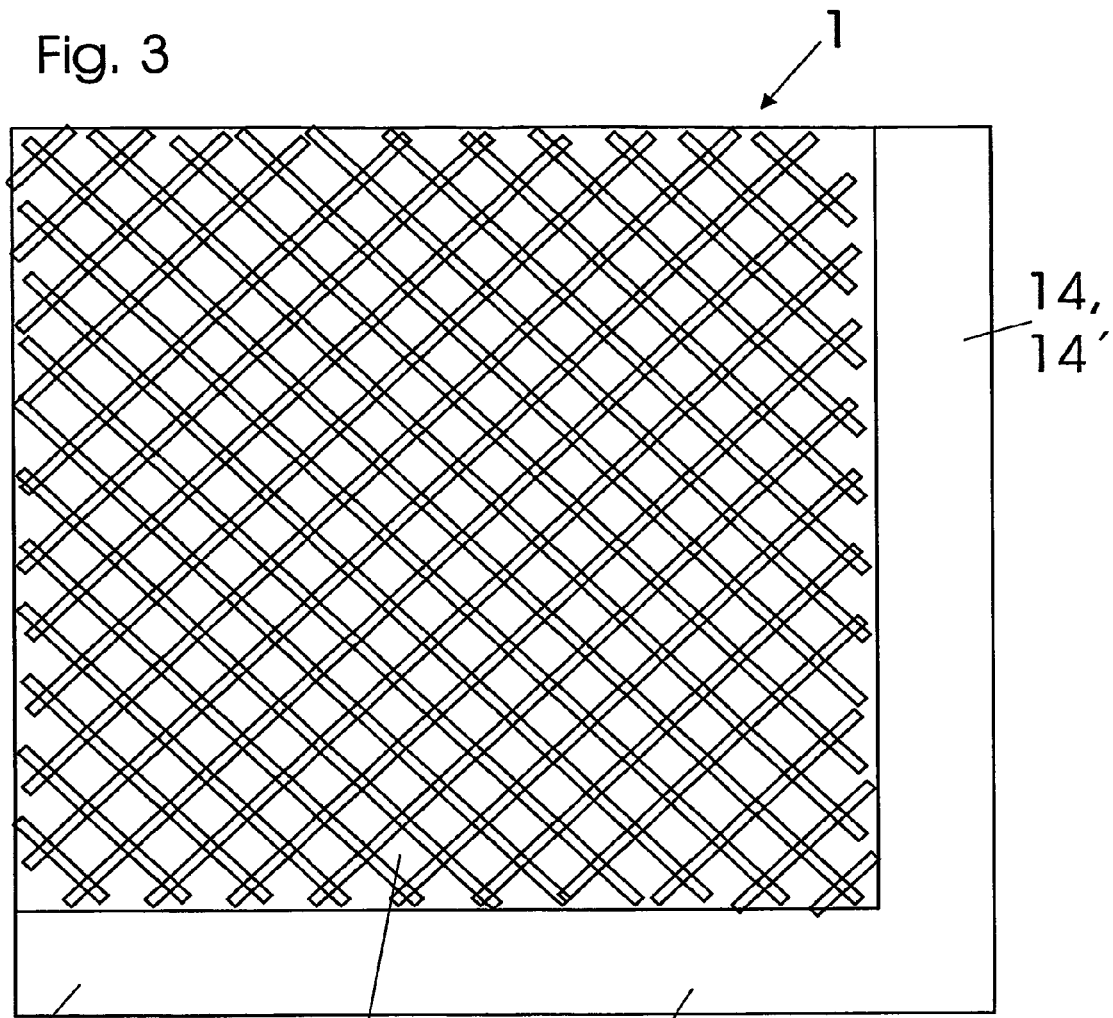
FIG. 3: the arrangement of overlapping areas for the reinforcing layer and the sealing layer on a decoupling system according to one embodiment of the present invention, as shown in FIG. 1.

FIG. 1 is a cross sectional side view that shows the layered structure of a multilayer decoupling and sealing system 1. FIG. 2 is a cross sectional plan view at the level of a sealing layer 4, and FIG. 3 is a plan view of the decoupling and sealing system 1, in cross section along the reinforcing layer 5. In FIG. 1, the decoupling and sealing system 1 according to one embodiment of the present invention is shown installed on a substratum 15, for instance in a cement screed or the like. Tile paving made up of tiles 10 can be seen above the decoupling and sealing system 1, and this is laid in tile mortar 12 by the thin-bed method. The joints 11 between the individual tiles 10 are similarly filled with tile mortar 12.

The decoupling and sealing system 1 consists of a sealing layer 4 that is applied to the substratum 15 and can, for example, be of polyethylene and can be laid as a strip of predetermined width. The sealing layer 4 can be cemented to the substratum 15 and it is also conceivable to allow the sealing layer 14 to float on the substratum 15 in order to decouple the substratum 15 from the tile paving 10. Such installation methods are known in principle, and for this reason will not be described in greater detail herein.

Above this sealing layer 4 an anchoring layer 2, 3, which is of a lattice-type structure that will be described below, is bonded to the sealing layer 4. This bond can be effected, for example, by cementing or welding in the manner known in principle, depending on the materials that are being used. This anchoring layer 2, 3 is made up of two individual layers 2, 3 between which a vapour pressure equalizing layer 6 can be disposed, as will be described in greater detail below.

The anchoring layer 2, 3—like the reinforcing layer that is joined to it and disposed above it—serves to anchor the decoupling and sealing system 1 to the tile mortar 12 and thus to the layer of tiles 10. The reinforcing layer 5 can, for example, consist in a manner known in principle of a lattice-type glass-fibre textile that incorporates appropriate openings and free areas so that the tile mortar 12 can penetrate as deeply as possible into the anchoring layer 2. The anchoring layer 2, 3 incorporates—as described in greater detail—receiving spaces 16 for the tile mortar 12, and thereby serves to improve the anchoring of the tile mortar 12 to the multilayer decoupling and sealing system 1.

The layer made up of tiles 10 is installed in that before the tiles 10 are laid, the tile mortar is applied on top of the reinforcing layer 5 and then trowelled so that it is pressed as deeply as possible through the openings in the reinforcing layer 5 into the anchoring layer 2, 3, if there is no optional vapour pressure equalizing layer 6. If there is a vapour pressure equalizing layer 6, then only the anchoring layer 2 will be filled with the tile mortar 12. The tile mortar 12, which is worked when in a plastic state, thus largely fills the receiving spaces 16 in the anchoring layer 2, 3 and flows almost completely around the individual rods 7, 8 of the anchoring layer 2, 3, which are formed in a manner described in greater detail below. Once the tile mortar 12 has hardened, there is a very solid bond between the anchoring layer 2, the reinforcing layer 5, and the tile mortar 12 that, on the one hand, anchors the tiles 10 firmly to the decoupling and sealing system 1 and, on the other hand, brings about a stable panel-like configuration of the anchoring layer 2, 3. Because of this, the decoupling and sealing system 1 can withstand mechanical loads that are applied to the tiles 10 from above in a particularly effective way.

The lattice-type structure of the anchoring layer 2, 3 is formed from individual rods 7, 8 that are disposed an angle to one another, and when arranged one above the other these form a two-course layer arrangement made up of the layers 2, 3. Each of the individual rods 7, 8 is of approximately rectangular cross section and they are hot-welded to one another at the points 9 where they intersect. In a particularly simple manner, this forms an arrangement wherein parallel groups of individual rods 7 are disposed one above the other and these are connected to similar parallel groups of individual rods 8 that are disposed at an angle to the groups of individual rods 7. Receiving spaces 16 are formed in the anchoring layer 2, 3 between the individual rods 7 or 8, respectively.

The lattice-type structure of individual rods 7, 8 also entails the advantage that within the area of the points of intersection 9, when the individual rods 7, 8 are welded, areas that have undercut portions are formed on the individual rods 7, 8, and these result in the tile mortar 12 that penetrates these areas being securely locked to the individual rods 7, 8 after it has hardened.

When larger areas are to be processed, it is recommended that both the reinforcing layer 5 and the sealing layer 4 be allowed to extend far enough beyond the edges of the lattice-type anchoring layer 2, 3 in overlap areas 14, 14' such that, overlapping these, they can be cemented or otherwise secured to corresponding layers that are to be adjacent to them.

It is self-evident that the arrangement of the individual rods 7, 8 that the shown in FIG. 2 and FIG. 3 should be considered only as examples, and that any type of geometrical pattern that is advantageous for the properties of the decoupling and sealing system described herein can be formed from such individual rods 7, 8.

An additional vapour pressure equalization layer 6 can be interposed between the two layers 2 and 3; this can be incorporated directly when the lattice-type structure of the anchoring layer is being made. A particularly simple and reliable attachment of the vapour pressure equalization layer 6 in the layered structure of the decoupling and sealing system can be achieved thereby. Such vapour pressure equalization layer 6 are known in principle and for this reason will not be discussed in greater detail herein.

In the manner known in principle, a layer 13 of non-woven material can be provided beneath the sealing layer 4, and this is can be laminated to the sealing layer 4 or otherwise attached thereto. In the event that the sealing layer is cemented to the substratum 15 it ensures particularly good attachment to the substratum 15 through mortar or adhesive.

Figure 4:
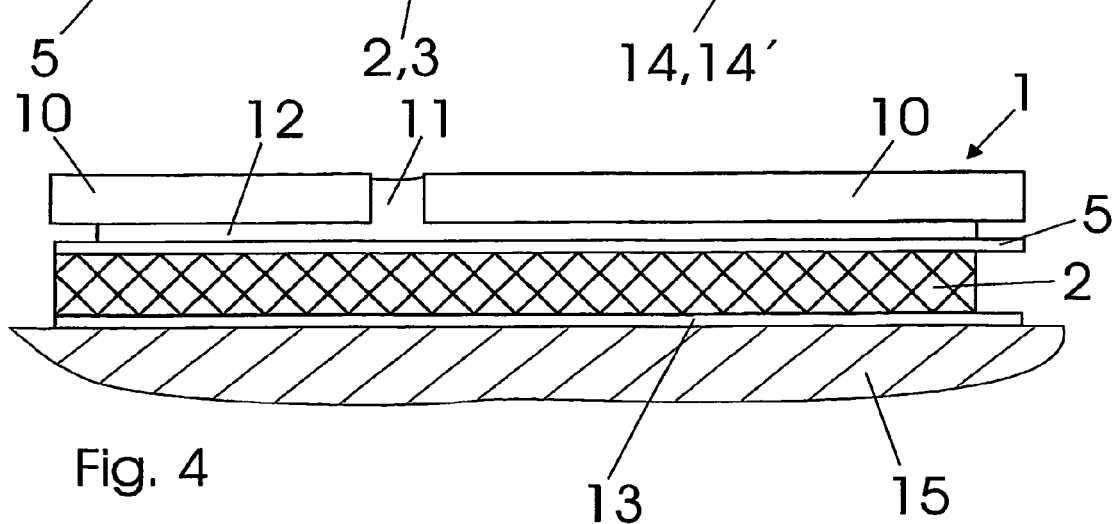
FIG. 4: another layered construction of the decoupling system without the interposed moisture-pressure equalizing layer and with only one layer of non-woven material underneath.

FIG. 4 shows another configuration of the decoupling system 1 according to one embodiment of the present invention, in which there is no vapour pressure equalization layer 6; in place of the sealing layer 4 there is only a layer 13 of non-woven material that is to be laid on the substratum 15. Because of this, the formation of the decoupling system can be made even simpler for substrata that are not affected by moisture, for instance dense, construction-site substrata 15, without detriment to the decoupling action below. Apart from that, the details set out above with respect to the characteristics of the layers apply accordingly.

PARTS LIST

1—Decoupling system
2—Anchoring layer
3—Anchoring layer
4—Sealing layer
5—Reinforcing layer
6—Vapour pressure equalization layer
7—Individual rod
8—Individual rod
9—Area of intersection
10—Non-woven material
11—Joint
12—Tile mortar
13—Non-woven material anchoring layer
14—Area of overlap 15—Substratum
16—Receiving space

What is claimed is:

1. A multilayer decoupling system for laying ceramic paving by using a thin-bed method, said system comprising:
   an anchoring fleece made of non-woven material,
   above the anchoring fleece an anchoring layer comprising a lattice-type structural element for incorporating filler material,
   an upper side of the decoupling system being configured to receive said filler material
   said filler material being plastic when applied and subsequently hardening within the anchoring layer; and
   a reinforcing layer which, at least in some sections, is rigidly affixed above said anchoring layer.

2. Decoupling system as defined claim 1, characterized in that the lattice-type structural element is formed from individual rods that are disposed to one another in the manner of a lattice and fixed to one another at the points of intersection of the lattice.

3. Decoupling system as defined in claim 2, characterized in that the individual rods of the lattice-type structural element are of an essentially rectangular cross section.

4. Decoupling system as defined claim 2, characterized in that the intersecting individual rods of the lattice-type structural element, are so arranged that a first layer consists of identically oriented individual rods beneath a second layer of individual rods that are disposed at an angle thereto and are in each instance oriented identically to one another.

5. Decoupling system as defined in claim 2, characterized in that the lattice-type structure of the individual rods is in the form of a rhombus, a rectangle, or a square.

6. Decoupling system as defined in claim 4, characterized in that the individual rods of the two layers are welded to one another at the points of intersection when under mechanical pressure.

7. Decoupling system as defined in claim 2, characterized in that the individual rods of the lattice-type structural element have edge areas that are slanted towards one another, at least at their points of intersection, thereby forming undercut sections on the individual rods.

8. Decoupling system as defined in claim 4, characterized in that a continuous vapour pressure equalizing layer is interposed in each instance between the first and second layer of individual rods.

9. Decoupling system as defined in claim 8, characterized in that the vapour pressure equalizing layer is formed by a polyethylene film.

10. Decoupling system as defined in claim 1, characterized in that the reinforcing layer is welded onto the anchoring layer.

11. Decoupling system as defined in claim 1, characterized in that the reinforcing layer is cemented onto the anchoring layer.

12. Decoupling system as defined in claim 1, characterized in that the reinforcing layer is in the form of a lattice-type textile, to provide for secure anchoring with the filler material that is to be incorporated on top of the decoupling system.

13. Decoupling system as defined in claim 1, characterized in that the reinforcing layer extends beyond the other layers at least in individual edge areas of the decoupling system so as to create a transition to other sections of the decoupling system.

14. Decoupling system as defined in claim 1, characterized in that the decoupling system is laid so as to float on a substratum.

15. Decoupling system as defined in claim 1, characterized in that the decoupling system is cemented to a substratum.

16. Decoupling system as defined in claim 1, further comprising a sealing layer that is formed from beneath said anchoring layer.

17. Decoupling system as defined in claim 1, characterized in that the thickness of the anchoring layer is between 2 and 6 mm.

18. Decoupling system as defined in claim 1, characterized in that the overall thickness of the decoupling system is between 2 and 8 mm.

19. Decoupling system as defined in claim 1, characterized in that after the incorporation of the filler material, the anchoring layer is essentially completely filled with the filler material and the reinforcing layer that is imbedded in the hardened filler material performs a stiffening and reinforcing function with respect to mechanical loads applied from above.

20. Decoupling system as defined in claim 1, characterized in that the decoupling system is configured as a façade element that is ventilated from behind.

21. Decoupling system as defined in claim 1, characterized in that the decoupling system is configured as a barrier element, in particular a barrier element that is of polystyrol.

* * * * *